(12) United States Patent
Hirano et al.

(10) Patent No.: US 6,514,317 B2
(45) Date of Patent: Feb. 4, 2003

(54) METHOD FOR PURIFYING HYDROGEN-BASED GAS MIXTURE

(75) Inventors: Shigeru Hirano, Shinnanyo (JP); Atsushi Harada, Shinnanyo (JP)

(73) Assignee: Tosoh Corporation, Shinnanyo (JP)

(*) Notice: Subject to any disclaimer, the term of this patent is extended or adjusted under 35 U.S.C. 154(b) by 0 days.

(21) Appl. No.: 09/838,146

(22) Filed: Apr. 20, 2001

(65) Prior Publication Data

US 2001/0045160 A1 Nov. 29, 2001

(30) Foreign Application Priority Data

Apr. 20, 2000 (JP) ........................ 2000-126226

(51) Int. Cl.[7] ........................ B01D 53/04; B01D 53/047
(52) U.S. Cl. ........................ 95/96; 95/106; 95/115; 95/117; 95/130; 95/139; 95/140; 95/143; 95/902
(58) Field of Search ........................ 95/96–106, 114, 95/115, 117, 130, 139, 140, 143, 902

(56) References Cited

U.S. PATENT DOCUMENTS

| 4,477,267 A | | 10/1984 | Reiss ........................ 95/139 |
| 4,859,217 A | * | 8/1989 | Chao ........................ 95/902 X |
| 5,152,813 A | * | 10/1992 | Coe et al. ................. 95/130 X |
| 5,464,467 A | * | 11/1995 | Fitch et al. ............... 95/130 X |
| 5,531,808 A | * | 7/1996 | Ojo et al. ................. 95/139 X |
| 5,868,818 A | * | 2/1999 | Ogawa et al. ............. 95/902 X |
| 5,912,422 A | | 6/1999 | Bomard et al. .............. 95/96 |
| 5,962,358 A | * | 10/1999 | Hees et al. ................ 95/130 X |
| 5,993,773 A | | 11/1999 | Funakoshi et al. .......... 423/709 |
| 6,036,939 A | * | 3/2000 | Funakoshi et al. ......... 95/130 X |
| 6,171,370 B1 | * | 1/2001 | Hirano et al. ................ 95/96 |
| 6,183,539 B1 | * | 2/2001 | Rode et al. ................. 95/117 |
| 6,258,152 B1 | * | 7/2001 | Labasque et al. ............ 95/96 |
| 6,261,344 B1 | * | 7/2001 | Labasque et al. ......... 95/902 X |
| 6,302,943 B1 | * | 10/2001 | Johnson et al. ........... 95/902 X |
| 6,340,382 B1 | * | 1/2002 | Baksh et al. .............. 95/143 X |

FOREIGN PATENT DOCUMENTS

| EP | 0 297 542 | 1/1989 |
| EP | 0893-157 | 1/1999 |
| EP | 0 940 174 | 9/1999 |
| EP | 0 982 064 | 3/2000 |
| EP | 1 103 525 | 5/2001 |
| JP | 4-6642 | 2/1992 |
| JP | 5-163015 | 6/1993 |
| JP | 10-212103 | 8/1998 |
| JP | 10-310422 | 11/1998 |
| JP | 11-76810 | 3/1999 |
| JP | 11-217212 | 8/1999 |
| JP | 11-343112 | 12/1999 |
| JP | 2000-225311 | 8/2000 |
| JP | 2001-501166 | 1/2001 |
| WO | WO 99/05063 | 2/1999 |
| WO | WO 00/01478 | 1/2000 |

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

Purification of a hydrogen-based gas mixture containing impurities such as carbon monoxide, nitrogen and methane is effected by contacting the gaseous mixture with a zeolite adsorbent which is a shaped product comprised of at least 95%, as determined on the basis of the moisture equilibrium adsorption value, of a low-silica type X zeolite having a $SiO_2/Al_2O_3$ molar ratio of 1.9 to 2.1. The zeolite adsorbent is preferably ion-exchanged with lithium and/or calcium. The zeolite adsorbent is preferably prepared by a process including a step of contacting with a caustic solution a calcined product of a mixture of a low-silica type X zeolite and kaolin clay whereby the kaolin clay is converted to a low-silica type X zeolite.

24 Claims, No Drawings

METHOD FOR PURIFYING HYDROGEN-BASED GAS MIXTURE

BACKGROUND OF THE INVENTION (1) Field of the Invention

This invention relates to a method for purifying a hydrogen-based gas mixture by adsorptive separation of impurity gases from the gas mixture. More particularly, it relates to a method for purifying a hydrogen-based gas mixture such as a gas produced by steam reforming of naphtha or other petroleum hydrocarbons, a coke oven gas, or a converter gas by adsorptive separation of impurity gases such as carbon monoxide, nitrogen and hydrocarbons such as methane from the hydrogen-based gas mixture.

(2) Description of the Related Art

Hydrogen-based gas mixtures such as a gas produced by steam reforming of naphtha or other petroleum hydrocarbons, a coke oven gas, or a converter gas contain impurity gases such as carbon monoxide, nitrogen and hydrocarbons. To recover hydrogen gas having a purity of at least 99% from the hydrogen-based gas mixtures, these impurity gases must be removed by adsorption or other means.

As means for separating carbon monoxide, nitrogen, hydrocarbons, carbon dioxide and water vapor, an adsorption method using an adsorbent is generally adopted. As the adsorbent, activated carbon and zeolite are widely used.

Purification of a hydrogen-based gas mixture for obtaining hydrogen gas having a high purity is generally carried out by a pressure swing adsorption (PSA) method. One-stage PSA process enables purification of the hydrogen-based gas mixture to remove impurity gases such as carbon monoxide, nitrogen, hydrocarbons, carbon dioxide and water vapor. However, in order to obtain hydrogen gas having a higher purity, a two-stage process is adopted wherein carbon dioxide, water vapor and hydrocarbons are previously removed by adsorption using activated carbon, and then, carbon monoxide, nitrogen and residual hydrocarbons are removed by adsorption using a zeolite Conventional zeolite adsorbents include type A zeolite, and faujasite zeolite having a $SiO_2/Al_2O_3$ molar ratio of at least 2.5. However, a zeolite adsorbent exhibiting a higher adsorbability for carbon monoxide, nitrogen and hydrocarbons is eagerly desired in a $H_2$-PSA method for reducing the size of equipment and the energy consumption.

A method of recovering hydrogen by using a type X zeolite having a $SiO_2/Al_2O_3$ molar ratio of 2 to 3 and exchanged with a calcium ion at an exchange ratio of at least 50% was proposed in Japanese Unexamined Patent Publication (hereinafter abbreviated to "JP-A") No. H4-6642. The use of a type X zeolite having an Si/Al atomic ratio of less than 1.5 and exchanged with a lithium ion at an exchange ratio of at least 80% for the adsorptive removal of carbon monoxide from a hydrogen-based gas mixture was proposed in U.S. Pat. No. 5,912,422. The use of a type X zeolite having an Si/Al atomic ratio of 1 to 3 and exchanged with a lithium ion and a calcium ion at an exchange ratio of at least 85% for the removal of carbon monoxide and/or nitrogen from a hydrogen-based gas mixture was proposed in JP-A H10-212,103. Further, the use of a low-silica type X zeolite having a $SiO_2/Al_2O_3$ molar ratio of 2 for the adsorptive removal of carbon monoxide was proposed in JP-A 2000-225311. However, the above-mentioned zeolite adsorbents include a binder exhibiting no adsorption capacity, and hence, its adsorption performance was poor, as explained below.

In general zeolite adsorbents are used in the form of a shaped product prepared by incorporating a binder in zeolite and shaping the mixture of zeolite and the binder into a desired shape. However, a binder has no adsorption performance, and hence, the zeolite adsorbent containing a binder has a relatively poor adsorption performance. Therefore, proposals of using a binder capable of being converted to zeolite have been made. For example, a method of producing a low-silica type X zeolite binderless shaped product has been proposed in JP-A H5-163,015 wherein a shaped product comprised of a type X zeolite powder having a $SiO_2/Al_2O_3$ molar ratio of smaller than 2.5, metakaolin converted from kaolin clay, sodium hydroxide and potassium hydroxide is maintained in an aqueous solution containing sodium hydroxide and potassium hydroxide at a temperature of 40 to 100° C. for several hours to several days whereby metakaolin is aged and converted to zeolite to give a binderless shaped product of a low-silica type X zeolite.

A shaped product comprised of at least 95% of a low-silica type X zeolite having a $SiO_2/Al_2O_3$ molar ratio of 2, which is prepared by using a binder capable of being converted to a zeolite, is described in JP-A H11-76810. This shaped product is prepared by a process wherein a low-silica type X zeolite is agglomerated by using a binder containing at least 80% of a clay capable of being converted to a zeolite; the thus-obtained agglomerate is shaped; the shaped product is dried and then calcined at a temperature of 500 to 700° C.; and the thus-obtained solid product is placed in contact with an aqueous alkali solution containing an alkali of at least 0.5 molar concentration comprising sodium hydroxide and potassium hydroxide, wherein the proportion of potassium hydroxide is not larger than 30% by mole based on the sum of sodium hydroxide and potassium hydroxide. The low-silica type X zeolite-containing shaped product has very low crush strength and contains a small amount of type A zeolite. Thus, the $SiO_2/Al_2O_3$ molar ratio as determined by chemical analysis is larger than the theoretical value, i.e., 2.0, and the low-silica type X zeolite in the shaped product has a low purity.

Further a shaped product comprised of at least 95% of a faujasite zeolite, which is prepared by using a binder capable of being converted to a zeolite, is described in WO 99/05063. This shaped product is prepared by a process which is similar to the above-mentioned process described in JP-A H11-76810 and in which a shaped product of an agglomerate comprised of LSX zeolite and a clay capable of being converted to zeolite is placed in contact with an aqueous alkali solution containing an alkali of at least 0.5 molar concentration. This shaped product of a low-silica type X zeolite has a low crush strength, and this literature is silent on the use thereof for adsorptive separation of carbon monoxide, nitrogen and methane for the purification of hydrogen, and suggests nothing about the cation species effective for enhancing adsorptive performance for these gases.

SUMMARY OF THE INVENTION

A primary object of the present invention is to provide an improved method for purifying a hydrogen-based gas mixture by adsorptive separation of impurities such as carbon monoxide, nitrogen and hydrocarbons, especially methane, using a special zeolite adsorbent.

In accordance with the present invention, there is provided a method for purifying a hydrogen-based gas mixture comprising the step of contacting a hydrogen-based gas mixture with a zeolite adsorbent; said zeolite adsorbent being a shaped product comprised of at least 95%, as determined on the basis of the moisture equilibrium adsorption value, of a low-silica type X zeolite having a $SiO_2/Al_2O_3$ molar ratio in the range of 1.9 to 2.1.

The shaped product of the low-silica type X zeolite preferably has an average crush strength of at least 1.0 kgf as measured on particles of the shaped product having a particle diameter in the range of 1.4 to 1.7 mm as prepared for crush strength measurement.

The cation contained in the shaped product of the low-silica type X zeolite is preferably at least one kind of cation selected from lithium, sodium, potassium, magnesium, calcium and zinc. The cation contained therein has preferably been ion-exchanged with a lithium ion at an ion exchange ratio of at least 90%, more preferably at least 95%, or with a calcium ion at an ion exchange ratio of at least 50%, more preferably at least 80% and most preferably at least 90%.

The shaped product is preferably comprised of at least 98% by weight, as determined on the basis of the moisture equilibrium adsorption value, of the low-silica type X zeolite. More preferably it consists essentially of the low-silica type X zeolite and is substantially free from a binder.

The shaped product preferably has a macro pore volume of at least 0.25 ml/g and an average pore diameter of at least 0.35 μm, and it is preferably a particle having an average particle diameter in the range of 0.5 to 3 mm, more preferably of 0.5 to 2 mm.

The method of the present invention is advantageously employed for purifying a hydrogen-based gas mixture comprising, in addition to hydrogen, at least one gas selected from carbon dioxide, carbon monoxide, nitrogen, water vapor, and hydrocarbons, especially methane. The gas mixture is preferably contacted with the zeolite adsorbent by a pressure swing adsorption method and/or a temperature swing adsorption method. The contact of the gas mixture with the zeolite adsorbent is preferably carried out at an adsorption pressure of 3 to 30 atm.

The shaped product can be prepared by a process comprising the steps of (i) shaping a mixture comprising a low-silica type X zeolite having a $SiO_2/Al_2O_3$ molar ratio in the range of 1.9 to 2.1 and a kaolin clay having a $SiO_2/Al_2O_3$ molar ratio in the range of 1.9 to 2.1; (ii) calcining the thus-shaped product, and then (iii) placing the calcined shaped product in contact with a caustic solution capable of dissolving silicon from the calcined shaped product in an amount larger than that of aluminum dissolved from the calcined shaped product whereby the kaolin clay contained in the calcined shaped product is converted to a low-silica type X zeolite. Preferably the calcined shaped product is kept in contact with a caustic solution of at least 6 moles per liter, for at least 10 hours, or a caustic solution of at least 8 moles per liter, for at least 5 hours. The caustic solution with which the calcined shaped product is placed in contact contains an aluminum ingredient previously incorporated therein.

DESCRIPTION OF THE PREFERRED EMBODIMENTS

The adsorbent used in the present invention is a shaped product comprised of at least 95%, preferably at least 98%, as determined on the basis of the moisture equilibrium adsorption value, of a low-silica type X zeolite having an $SiO_2/Al_2O_3$ molar ratio in the range of 1.9 to 2.1. By the phrase "as determined on the basis of the moisture equilibrium adsorption value" used herein, we mean that the content in % of the low-silica type X zeolite in the shaped product is defined by the following equation:

$$A=[B/C]\times 100$$

where

A: content (%) of low-silica type X zeolite in shaped product,

B: moisture equilibrium adsorption value of the shaped product, and

C: moisture equilibrium adsorption of the low-silica type X zeolite having the same weight as the shaped product. Most preferably the shaped product consists essentially of low-silica type X zeolite and is substantially free from a binder.

The shaped product preferably contains at least one kind of cation selected from lithium, sodium, potassium, magnesium, calcium and zinc. The cation contained therein has preferably been ion exchanged with a lithium ion at an ion exchange ratio of at least 90%, more preferably at least 95%, or with a calcium ion at an ion exchange ratio of at least 50%, more preferably at least 80% and most preferably at least 90%.

As explained above, the adsorption of gas by a zeolite occurs due to the interaction between cations present in the zeolite and gas molecules, and thus, with an increase in number of cations present in the zeolite, the capacity of gas adsorption increases. The number of cations present in a zeolite molecule varies depending upon the number of aluminum in the crystal skeleton structure of zeolite, namely, as the number of aluminum increases (i.e., the $SiO_2/Al_2O_3$ molar ratio of the zeolite is reduced), the number of cations increases. The minimum value of $SiO_2/Al_2O_3$ molar ratio of zeolite is known as 2.0 by the Loewenstein theory. The low-silica type X zeolite used in the present invention has the minimum $SiO_2/Al_2O_3$ molar ratio, but, in consideration of measurement inaccuracy of chemical analysis and other factors, the zeolite used is defined as having an $SiO_2/Al_2O_3$ molar ratio in the range of 1.9 to 2.1. A type A zeolite also is known as having an $SiO_2/Al_2O_3$ molar ratio of 2.0, but its pore diameter is small, i.e., about 4 to 5 angstroms, and thus, is not advantageous for separation of gas. In contrast, the low-silica type X zeolite has a pore diameter of about 7 to 8 angstroms, and is suitable for gas separation.

The low-silica type X zeolite crystal can be synthesized by various methods. For example, methods described in JP-A H11-217212, JP-A H10-310422 and JP-A H11-343112 can be adopted.

A zeolite crystal powder has no self-binding property and hence a binder is incorporated therein to be shaped into beads, pellets or other forms for an industrial use as an adsorbent. A binder usually has no capability of adsorbing gases, and therefore, the adsorption capacity of commercially available adsorbents is poor as compared with the adsorption capacity of a zeolite crystal powder. Therefore, a binder capable of being converted to a zeolite crystal is used in the present invention to obtain a shaped product comprised of a low-silica type X zeolite having a good adsorption capacity and substantially free from a binder.

The shaped product of a low-silica type X zeolite used in the present invention can be prepared by a process described below. As a low-silica type X zeolite powder used as a raw material, those which are prepared by methods described, for example, in JP-AH11-217212, JP-AH10-310422 and JP-AH11-343112 can be mentioned. To 100 parts by weight of this low-silica type X zeolite powder, 10 to 50 parts by weight of a kaolin clay binder capable of being converted to a low-silica type X zeolite was incorporated together with an appropriate amount of water, and the resulting mixture is uniformly kneaded together. When the amount of kaolin clay is too small, the resulting shaped product does not have a high crush strength. In contrast, when the amount of kaolin clay is too large, crystallization does not proceed to the desired extent, and the low-silica type X zeolite in the resulting shaped product has a poor purity. The amount of water incorporated for kneading varies depending upon the amount of kaolin clay and the manner in which the kneaded mixture is shaped into pellets or beads. Various organic and inorganic shaping aids may be added for enhancing the shapability provided that the subsequent calcination and conversion of kaolin clay into a zeolite are not badly influenced to any appreciable extent. The mixture can be shaped into pellets, beads or other forms by appropriate methods. For example, an extrusion-pelletizing method for pellets, and a stirring or rolling method for beads can be employed.

The pellets, beads or other shaped products are dried and then calcined at a temperature of 500 to 700° C., preferably 600 to 650° C. to obtain a shaped product containing low-silica type X zeolite. The calcination is essential for enhancing the convertibility of kaolin clay into a low-silica type X zeolite. That is, kaolin clay is changed to amorphous metakaolin by calcination, which is relatively easily converted to a low-silica type X zeolite. The drying and calcination can be carried out by ordinary means using, for example, a hot-air dryer, a muffle furnace, a rotary kiln and a tubular furnace.

The calcined shaped product of a low-silica type X zeolite is then placed in contact with a caustic solution capable of dissolving silicon from the calcined shaped product in an amount larger than that of aluminum dissolved from the calcined shaped product whereby the kaolin clay contained in the calcined shaped product is converted to a low-silica type X zeolite (said treatment of contacting the calcined shaped product with the caustic solution to convert the kaolin clay binder to a low-silica type X zeolite and thus to reduce the content of binder is hereinafter abbreviated to "binderless treatment" when appropriate). The caustic solution capable of dissolving silicon from the calcined shaped product in an amount larger than that of aluminum dissolved from the calcined shaped product is, for example, a caustic solution exhibiting a higher solubility for a silicate than that for an aluminate. The solubility of a solution varies depending upon the composition and concentration thereof, and temperature, and hence, the composition and concentration of the caustic solution varies depending upon the temperature at which the contacting is effected.

The caustic solution used is preferably a solution containing sodium hydroxide and potassium hydroxide. The proportion of sodium hydroxide and potassium hydroxide is preferably such that the atomic ratio of K/(Na+K) is in the range of 0.1 to 0.4. When the atomic ratio is smaller than 0.1 or larger than 0.4, metakaolin in the shaped product is difficult to be converted into a low-silica type X zeolite to the desired extent, and impurities such as type A zeolite, sodalite, type F zeolite and type E zeolite tend to be produced, and thus, a shaped product containing a low-silica type X zeolite at a desired high concentration is difficult to obtain.

The amount of an alkali metal hydroxide in the caustic solution used for the binderless treatment must be at least about 5 times of the amount required for converting the entire amount of kaolin clay contained in the low-silica type X zeolite-containing shaped product into a low-silica type X zeolite. To obtain a low-silica type X zeolite-containing shaped product with a high purity within a short period of treating time, the amount of an alkali metal hydroxide in the caustic solution is preferably at least about 10 times of the amount required for converting the entire amount of kaolin clay into a low-silica type X zeolite. However, if the amount of an alkali metal hydroxide in the caustic solution is too large, i.e., at least 30 times or larger, the production cost increases and the amounts of aluminum and silicon dissolved from the shaped product become undesirably large, which leads to reduction of crush strength of the shaped product.

In the case where a caustic solution containing sodium hydroxide and potassium hydroxide at the atomic ratio described above is used, the concentration of the sum of sodium hydroxide and potassium hydroxide in the solution is at least about 6 moles/liter and preferably at least about 8 moles/liter, for the dissolution of silicon from the calcined shaped product in an amount larger than that of aluminum dissolved from the calcined shaped product. With an increase of the caustic concentration, the amount of a silicate relative to that of an aluminate in the caustic solution is increased and the efficiency of the contact treatment therewith is enhanced. Even when the caustic concentration is about 6 moles/liter, if the time of the binderless treatment is too short, metakaolin in the shaped product is difficult to be converted into a low-silica type X zeolite to the desired extent.

An aluminum ingredient can be previously incorporated in the caustic solution used for the binderless treatment. The aluminum ingredient includes soluble and insoluble ingredients, and it is not particularly limited provided that aluminum can be positively used for the formation of a low-silica type X zeolite from metakaolin. As specific examples of the aluminum ingredient, there can be mentioned sodium aluminate, and a low-silica type X zeolite, kaolin clay or other aluminum-containing solid. It is also preferable that the caustic solution used for binderless treatment and containing a residual aluminum ingredient is repeatedly used. In the case where a caustic solution having incorporated therein an aluminum ingredient is used, even when the caustic concentration is lower than that of a caustic solution containing no aluminum ingredient, the conversion of metakaolin to a low-silica type X zeolite to the desired extent can be achieved.

The binderless treatment of the shaped product with the caustic solution is carried out at a temperature of at least 40° C. The efficiency of the binderless treatment increases with an elevation of the temperature, but, a preferable treating temperature is in the range of 70 to 80° C. in view of the fact that the conversion of metakaolin to a low-silica type X zeolite is an exothermic reaction, and further in view of the limitation of heat-resisting temperature of equipment material, and the minimization of impurity production.

With an increase of the caustic concentration, the time of binderless treatment can be short. When the caustic concentration is at least 6 moles/liter and at least 8 moles/liter, the time of binderless treatment required for the conversion of metakaolin to a low-silica type X zeolite to the desired extent is usually at least 10 hours and at least 5 hours, respectively.

The manner in which the low-silica type X zeolite-containing shaped product is contacted with the caustic solution is not particularly limited. It is preferable in view of ease and efficiency that the caustic solution is passed through a fixed bed column packed with the low-silica type X zeolite-containing shaped product.

The cation of a low-silica type X zeolite contained in the shaped product used for purification of hydrogen according to the invention is preferably selected from lithium, sodium, potassium, magnesium, calcium and zinc. These cations may be contained either alone or in combination. To enhance the adsorptive separation of carbon monoxide, nitrogen and hydrocarbons, especially methane, from a hydrogen-based gas mixture, the cation contained therein has preferably been ion exchanged with a lithium ion at an ion exchange ratio of at least 90%, more preferably at least 95%, or with a calcium ion at an ion exchange ratio of at least 50%, more preferably at least 80% and most preferably at least 90%.

The kind of cation contained in a zeolite adsorbent is an important factor for its adsorption performance. For example, where a hydrogen-based gas mixture is purified by a PSA method, a zeolite adsorbent is preferably used, which exhibits a large effective adsorption capacity in a working pressure range, more specifically, exhibits a large adsorption capacity for carbon monoxide and other impurities under an adsorption pressure and a small adsorption capacity therefor under a desorption pressure. The effective adsorption capacity has a close relationship with the intensity of electric field. That is, if the intensity of electric field is too strong, then the adsorption capacity under a desorption pressure is large, which leads to reduction of the effective adsorption capacity. In contrast, if the intensity of electric field is too weak, the adsorption capacity is low over the working pressure range. By ion-exchanging the zeolite adsorbent with a lithium ion or a calcium ion as mentioned below, an electric field with an appropriate intensity giving a large effective adsorption capacity for carbon monoxide and other impurities is formed.

The method of ion-exchanging the low-silica type X zeolite-containing shaped product with a lithium ion and/or a calcium ion can be conventional, and includes, for example, a batchwise method and a continuous method wherein a lithium- and/or calcium-containing solution is passed through a column packed with the low-silica type X zeolite-containing shaped product. The temperature and the concentration of the lithium- and/or calcium-containing solution are not particularly limited. But, a high temperature, especially 50° C. or higher, is preferable in view of the ion-exchange equilibrium and the rate of reaction. A high lithium and/or calcium concentration, usually a lithium and/or calcium concentration of at least 1 mole/liter, is preferable. The lithium compound and the calcium compound are not particularly limited provided that they are soluble in water, and they include, for example, chloride, nitrate, sulfate and carbonate. Lithium is expensive as compared with calcium and other cations, and hence, a lithium-containing solution can be repeatedly used by removing impurities from the solution as used for ion exchange.

The high-purity low-silica type X zeolite-containing shaped product before the ion exchange according to the present invention usually contains sodium and potassium as ion-exchangeable cations. Therefore, when the shaped product is ion-exchanged with lithium and/or calcium, it is possible that certain amounts of originally contained sodium and potassium remain in the ion-exchanged shaped product. Even though the ion-exchanged shaped product contains the residual sodium and potassium, it can be used as an adsorbent according to the present invention. The ion-exchanged shaped product may have been ion-exchanged with cations, other than lithium and/or calcium cations, such as those of alkali metals such as sodium and potassium, alkaline earth metals such as magnesium or transition metals such as zinc.

The as-ion-exchanged shaped product is dried to some extent and then calcined at a temperature of 500 to 550° C. in dry air or nitrogen atmosphere to give an adsorbent.

The high-purity low-silica type X zeolite-containing shaped product prepared by the above-mentioned process has an extremely enhanced crush strength, namely, an average crush strength of at least 1.0 kgf as measured when the shaped product is classified into particles with a particle diameter in the range of 1.4 to 1.7 mm. Thus, the shaped product can be advantageously used under industrial conditions.

It is preferable that the high-purity low-silica type X zeolite-containing shaped product exhibits enhanced rates of adsorption and desorption for carbon monoxide, nitrogen and hydrocarbons, especially methane in addition to a high equilibrium adsorption of these impurities. For example, in the case where the adsorptive separation of carbon monoxide, nitrogen and hydrocarbons from a hydrogen-based gas mixture is effected by using a zeolite adsorbent, the rates of adsorption and desorption are influenced by a macro-pore structure of the zeolite adsorbent. The macro-pores are formed among the zeolite crystal particles, and the mass transfer rate is controlled by the macro-pores. Therefore, a large pore volume and a large pore diameter are preferable. The high-purity low-silica type X zeolite-containing shaped product prepared by the above-mentioned process has a macro pore volume of at least 0.25 ml/g and an average pore diameter of at least 0.35 $\mu$m. Therefore, there can be obtained a mass transfer rate at which the adsorption capacity inherently possessed by the adsorbent is not reduced. If the macro pore volume and the average pore diameter are smaller than the above values, the mass transfer rate is not sufficiently high and the adsorption capacity inherently possessed by the adsorbent cannot be manifested.

The shaped product used in the present invention can be in the form of pellets or beads, and preferably has an average particle diameter in the range of 0.5 to 3 mm, more preferably 0.5 to 2 mm. At an average particle diameter of larger than 3 mm, the surface area per unit volume of the adsorbent-packed bed is small, and the mass transfer rate within each particle is reduced to an undesirable extent. At an average particle diameter of smaller than 0.5 mm, the pressure drop of the adsorbent-packed bed is too large and the energy consumption is undesirably increased. The average particle diameter can be determined by an ordinary method which includes, for example, a sieving method and a method by calculating from the pressure loss when a gas stream is passed through the adsorbent-packed bed according to the Ergun equation.

The purification of a hydrogen-based gas mixture using the above-mentioned low-silica type X zeolite-containing zeolite according to the present invention can be effected by a pressure swing adsorption (PSA) method wherein the pressure is repeatedly increased and reduced, or a temperature swing adsorption (TSA) method wherein the temperature is repeatedly elevated and lowered, or a combination of the PSA method with the TSA method.

The hydrogen-based gas mixture often contains impurities such as carbon dioxide and water vapor which have a strong affinity with the zeolite adsorbent and hence are difficult to desorb. To remove these impurities, the hydrogen-based gas mixture can be pre-treated with an adsorbent such as activated carbon prior to the contact with the low-silica type X zeolite-containing shaped product.

When the purification of hydrogen-based gas mixture is conducted by using the above-mentioned high-purity low-silica type X zeolite adsorbent according to the method of the present invention, a high adsorption capacity is manifested for carbon monoxide, nitrogen and hydrocarbons such as methane, and therefore, a small-size adsorption apparatus can be employed, and the energy consumption is reduced.

The invention will now be described more specifically by the following working examples that by no means limit the scope of the invention.

Evaluation of zeolite and its shaped product was conducted by the following methods.

(1) Chemical Composition

A zeolite specimen is dissolved in a mixed solvent of nitric acid and hydrofluoric acid, and concentrations of metal ions are measured by an ICP (inductively coupled plasma) emission analyzer ("Optima 3000" available from Perkin-Elmer Co.). The concentration of a metal ion is expressed by an ion equivalent ratio. For example, the concentration of Li ion in a solution containing Li ion, Na ion and K ion is expressed by the ion equivalent ratio of Li ion represented by the formula Li/(Li+Na+K).

(2) Crystal Structure

Determination is conducted by an X ray diffraction apparatus ("MXP-3" available from MacScience Co.).

(3) Moisture Equilibrium Adsorption

A zeolite specimen dried at a temperature of higher than 60° C. is allowed to stand in a desiccator maintained at a temperature of 25° C. and a relative humidity of 80% for at least 16 hours. Then ignition loss is measured by heating the specimen at a temperature of 900° C. for 1 hour. The moisture equilibrium adsorption is calculated from the following equation.

Moisture equilibrium adsorption (%)=[($X_1$−$X_2$)/$X_2$]×100 where $X_1$ is weight as measured after standing in the desiccator but before the ignition, and $X_2$ is weight as measured after the ignition.

(4) Adsorption Capacity

Adsorption capacity of carbon monoxide, adsorption capacity of nitrogen and adsorption capacity of methane are measured by using adsorption measurement apparatuses "BELSORP 28SA" and "BELSORP HP" both available from BEL Japan Inc. at a temperature of 25° C. The specimen used is kept in vacuo (under a pressure of not higher than 1×10$^{-3}$ mmHg) at a temperature of 350° C. for 2 hours before measurement of the adsorption capacity. The respective adsorption isotherms are approximated according to the Langmuir equation.

Effective adsorption capacity of carbon monoxide, nitrogen or methane at a pressure of 1 atm—0.1 atm was expressed by the difference between the adsorption capacity as determined at a pressure of 1 atm and the adsorption capacity as determined at a pressure of 0.1 atm.

(5) Macro-Pore Volume and Average Pore Diameter

Using a mercury-intrusion type porosimeter ("Poresizer-9310" available from Micromeritics Co.), macro-pore volume and average pore diameter of an activated adsorbent is measured in a pressure range of 1 to 30,000 psi (for pore diameter of 60 Å (angstrom) to 200 μm).

(6) Average Crush Strength

Following the testing method described in JIS-R-1608, average crush strength is measured as follows. An activated zeolite shaped product specimen in a particulate form is used. The crush strength varies depending upon the particle diameter of particulate specimen, and therefore, the specimen used herein is prepared by sieving the particulate specimen to pick up particles having a particle diameter of 1.4 to 1.7 mm. Using Kiya digital hardness tester ("KHT-20N" available from Fujiwara Laboratories), a compressive load is applied to the sieved particulate specimen by pressing a stainless steel pressing plate with a diameter of 5 mm against the specimen at a constant rate of 1 mm/sec at room temperature and atmospheric pressure, and the maximum load (unit: kgf) which the specimen can withstand is measured. The measurement is conducted on 25 specimens and the crush strength is expressed by an average value of the 25 maximum loads.

EXAMPLE 1

(1) Preparation and Evaluation of Low-Silica Type X Zeolite Powder

A stainless steel reaction vessel having an inner volume of 20 liters was charged with 10,770 g of an aqueous sodium silicate ($Na_2O$: 3.8% by weight, $SiO_2$: 12.6% by weight) solution, 1,330 g of water, 1,310 g of sodium hydroxide (purity: 99%) and 3,630 g of an aqueous solution of industrial potassium hydroxide (purity: 48%), and the content was maintained at 45° C. by a water bath while being stirred at 100 rpm. To this content, an aqueous sodium aluminate ($Na_2O$: 20.0% by weight, $Al_2O_3$: 22.5% by weight) solution maintained at 40° C. was added over a period of 1 minute. Immediately after the commencement of addition, the content began to become white-turbid and gelled. Immediately before the completion of addition, the viscosity of the entire gel was increased and the slurry was partly stagnant in the upper part of the content in the reaction vessel, but, about three minutes later, the entire gel was uniformly fluidized. When the slurry was fluidized, an aqueous dispersion of 4.22 g of low-silica type X zeolite powder (ignition loss: 22.5%) in a minor amount of water was added. The amount of the low-silica type X zeolite powder added was 0.1% by weight based on the amount of the finally resulting low-silica type X zeolite. The thus-obtained slurry had a composition represented by the formula:

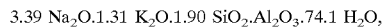
3.39 $Na_2O.1.31$ $K_2O.1.90$ $SiO_2.Al_2O_3.74.1$ $H_2O$, and the concentration of the theoretically produced low-silica type X zeolite was 14.7% by weight. The slurry was aged at 45° C. for 4 hours while being stirred at 100 rpm. After the aging, the temperature of the slurry was elevated to 70° C. over a period of 1 hour while the stirring was continued. When the temperature reached 70° C., stirring was stopped and the slurry was subjected to crystallization at 70° C. for 8 hours. The thus-obtained crystal was filtered, washed thoroughly with pure water and then dried at 70° C. overnight.

X-ray diffraction of the obtained low-silica type X zeolite (LSX) powder revealed that it was a single phase faujasite zeolite. Chemical analysis thereof revealed that it had a composition represented by the formula:

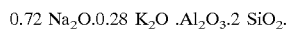
0.72 $Na_2O.0.28$ $K_2O$ .$Al_2O_3$.2 $SiO_2$.

The $SiO_2/Al_2O_3$ molar ratio was 2.0 and the moisture equilibrium adsorption was 33.5%.

(2) Preparation and Evaluation of Low-Silica Type X Zeolite Shaped Product

To 100 parts by weight of this LSX powder, 20 parts by weight of kaolin clay having a $SiO_2/Al_2O_3$ molar ratio of 2.0 ("Hydrite PXN" available from Dry Branch Kaolin Co.) was incorporated and mixed together for 15 minutes by a Mixmuller mixing machine ("MSG-15S" available from Shinto Kogyo Ltd.), and then a required amount of water was added, followed by kneading for 15 minutes. The kneaded product contained about 38% by weight of water.

The kneaded product was granulated by using a stirring-type granulator Henschel mixer ("FM/I-750" available from Mitsui Mining Co.) to give a shaped product in the form of beads having an average particle diameter of 1.6 mm and a particle diameter distribution ranging from 1.2 mm to 2.0 mm. The grains of beads were dressed by a Marumerizer molding machine ("Q-1000" available from Fuji Paudual Co. Ltd.) and then dried at 60° C. overnight. The dried beads were calcined at 600° C. for 3 hours under an air stream by using a tubular furnace (available from Advantec Co.) whereby kaolin in the beads was converted to metakaolin to give a shaped product containing low-silica type X zeolite.

A SUS304 stainless steel column having an inner volume of 13 liters was packed with 9.0 kg of the shaped product containing low-silica type X zeolite. Then the shaped product was washed with pure water at 40° C. After completion of washing, 25.2 liters of an aqueous caustic solution containing 7.2 moles/liter of NaOH and 2.8 moles/liter of KOH and maintained at 40° C. was circulated upward through the column at a rate of 560 ml/min for 3 hours. Then the temperature of the caustic solution was elevated from 40° C. to 70° C. while the solution was circulated. The circulation was continued for 6 hours at 70° C. whereby the shaped product containing low-silica type X zeolite was crystallized. The amount of the alkali metal hydroxides contained in the caustic solution was 18 times of the amount required for converting the entire kaolin clay contained in the shaped product to low-silica type X zeolite.

After recovery of the caustic solution, pure water was passed through the column to thoroughly wash the low-silica type X zeolite beads packed therein. The thus-obtained binderless shaped product containing low-silica type X zeolite in the form of beads exhibited a moisture equilibrium adsorption of 33.4% by weight, and thus, the content of a low-silica type X zeolite in the binderless shaped product was calculated as 99.7% from the moisture equilibrium adsorption value. X-ray diffraction of the low-silica type X zeolite-containing binderless shaped product revealed that it was comprised of a single phase faujasite zeolite, and diffraction attributed to impurities was not found.

The low-silica type X zeolite-containing binderless shaped product was placed in contact with an aqueous lithium chloride solution having incorporated therein lithium hydroxide to adjust the pH value to about 11, whereby a cation exchange was effected to give a Li low-silica type X zeolite-containing binderless shaped product. Chemical analysis of the binderless shaped product revealed that the Li ion exchange ratio was 98.3%, the Na ion exchange ratio was 1.3%, the K ion exchange ratio was 0.4%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

Adsorption capacities of carbon monoxide, nitrogen and methane were measured. The adsorption capacity at a pressure of 1 atm and the effective adsorption capacity at a pressure of 1 atm–0.1 atm were evaluated, and the results are shown in Table 1. The macro pore volume and the average pore diameter were evaluated by a mercury intrusion method, and the results are shown in Table 2. The binderless shaped product exhibited an average crush strength of 1.7 kgf as measured on particles having a particle diameter of 1.4 to 1.7 mm.

EXAMPLE 2

By the same procedures as described in Example 1, a low-silica type X zeolite-containing binderless shaped product was prepared. This binderless shaped product was placed in contact with an aqueous lithium chloride solution whereby an ion exchange was effected to give a Li low-silica type X zeolite-containing binderless shaped product. The aqueous lithium chloride solution used for ion-exchange was prepared by dissolving lithium carbonate in aqueous hydrochloric acid to obtain an aqueous lithium chloride solution having a pH value of about 7, and adding lithium hydroxide to the aqueous lithium chloride solution to adjust the pH value to about 11.

Chemical analysis of the Li low-silica type X zeolite-containing binderless shaped product revealed that the Li ion exchange ratio was 95.3%, the Na ion exchange ratio was 2.3%, the K ion exchange ratio was 1.7%, the Mg ion exchange ratio was 0.3% and the Ca ion exchange ratio was 0.4%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

Adsorption capacities of carbon monoxide, nitrogen and methane were measured. The adsorption capacity at a pressure of 1 atm and the effective adsorption capacity at a pressure of 1 atm–0.1 atm were evaluated, and the results are shown in Table 1. The binderless shaped product exhibited an average crush strength of 1.5 kgf as measured on particles having a particle diameter of 1.4 to 1.7 mm.

EXAMPLE 3

By the same procedures as described in Example 1, a low-silica type X zeolite-containing binderless shaped product was prepared. This binderless shaped product was placed in contact with an aqueous lithium chloride solution having added thereto lithium hydroxide to adjust the pH value to about 11, whereby an ion exchange was effected. Chemical analysis of the thus-obtained Li low-silica type X zeolite-containing binderless shaped product revealed that the Li ion exchange ratio was 86.0%, the Na ion exchange ratio was 10.7% and the K ion exchange ratio was 3.3%, and the $SiO_2/Al_2O_3$ molar ratio was 2.0. Ca and Mg were not found. The binderless shaped product was calcined to be thereby activated in the same manner as in Example 1.

Adsorption capacities of carbon monoxide, nitrogen and methane were measured. The adsorption capacity at a pressure of 1 atm and the effective adsorption capacity at a pressure of 1 atm–0.1 atm were evaluated, and the results are shown in Table 1. The binderless shaped product exhibited an average crush strength of 1.5 kgf as measured on particles having a particle diameter of 1.4 to 1.7 mm.

EXAMPLE 4

By the same procedures as described in Example 1, a low-silica type X zeolite-containing binderless shaped product was prepared. This binderless shaped product was placed in contact with an aqueous calcium chloride solution having added thereto calcium hydroxide to adjust the pH value to about 11, whereby an ion exchange was effected. Chemical analysis of the thus-obtained Ca low-silica type X zeolite-containing binderless shaped product revealed that the Ca ion exchange ratio was 94.4%, the Na ion exchange ratio was 3.3% and the K ion exchange ratio was 2.3%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

Adsorption capacities of carbon monoxide, nitrogen and methane were measured. The adsorption capacity at a pressure of 1 atm and the effective adsorption capacity at a pressure of 1 atm–0.1 atm were evaluated, and the results are shown in Table 1. The binderless shaped product exhibited an average crush strength of 1.4 kgf as measured on particles having a particle diameter of 1.4 to 1.7 mm.

Comparative Example 1

By the same procedures as described in Example 1 except that the amount of kaolin was changed to 30 parts by weight, a low-silica type X zeolite-containing shaped product was prepared. A polypropylene column having an inner volume of 3.1 liters was packed with 2.2 kg of thus-obtained shaped product. By passing 8.1 liters of an aqueous caustic solution containing 2.2 moles/liter of NaOH and 0.9 mole/liter of KOH through the column in the same manner as in Example 1 to conduct a binderless treatment, i.e., convert kaolin in the shaped product into a low-silica type X zeolite. The amount of the alkali metal hydroxides contained in the caustic solution was 7.5 times of the amount required for converting the entire kaolin clay contained in the shaped product to low-silica type X zeolite.

Then, pure water was passed through the column to thoroughly wash the low-silica type X zeolite-containing binderless shaped product packed therein. The obtained binderless shaped product exhibited a moisture equilibrium adsorption of 30.5% by weight, and thus, the content of a low-silica type X zeolite in the binderless shaped product was calculated as 91% from the moisture equilibrium adsorption value. X-ray diffraction of the low-silica type X zeolite-containing binderless shaped product revealed that it was comprised of a faujasite zeolite and a type A zeolite.

The binderless shaped product was subjected to a Li ion exchange treatment in the same manner as in Example 1. Chemical analysis of the ion-exchanged binderless shaped product revealed that the Li ion exchange ratio was 97.9%, the Na ion exchange ratio was 1.9% and the K ion exchange ratio was 0.2%, and the $SiO_2/Al_2O_3$ molar ratio was 2.0. The binderless shaped product was calcined to be thereby activated in the same manner as in Example 1.

Adsorption capacities of carbon monoxide, nitrogen and methane were measured. The adsorption capacity at a pressure of 1 atm and the effective adsorption capacity at a pressure of 1 atm–0.1 atm were evaluated, and the results are shown in Table 1. The binderless shaped product exhibited an average crush strength of 1.5 kgf as measured on particles having a particle diameter of 1.4 to 1.7 mm.

Comparative Example 2

By the same procedures as described in Example 1, a low-silica type X zeolite-containing shaped product was prepared. By using 16.2 liters of an aqueous caustic solution containing 3.0 moles/liter of an alkali (2.2 moles/liter of NaOH and 0.8 mole/liter of KOH), a binderless treatment was conducted, i.e., kaolin in the shaped product was converted into a low-silica type X zeolite in the same manner as in Example 1. The amount of the alkali metal hydroxides contained in the caustic solution was 7.5 times of the amount required for converting the entire kaolin clay contained in the shaped product to low-silica type X zeolite.

Then, pure water was passed through the column to thoroughly wash the low-silica type X zeolite-containing binderless shaped product packed therein. The obtained binderless shaped product exhibited a moisture equilibrium adsorption of 30.5% by weight, and thus, the content of a low-silica type X zeolite in the binderless shaped product was calculated as 91.0% from the moisture equilibrium adsorption value. X-ray diffraction of the low-silica type X zeolite-containing binderless shaped product revealed that it was comprised of a faujasite zeolite and a type A zeolite.

The binderless shaped product was subjected to a lithium ion exchange treatment in the same manner as in Example 3. Chemical analysis of the Li ion-exchanged binderless shaped product revealed that the Li ion exchange ratio was 97.5%, the Na ion exchange ratio was 1.8%, and the K ion exchange ratio was 0.7%, and the $SiO_2/Al_2O_3$ molar ratio was 2.0. The binderless shaped product was calcined at 500° C. for 3 hours under a dry air stream in a tubular furnace (available from Advantec Co.) to be thereby activated.

Adsorption capacities of carbon monoxide, nitrogen and methane were measured. The adsorption capacity at a pressure of 1 atm and the effective adsorption capacity at a pressure of 1 atm–0.1 atm were evaluated, and the results are shown in Table 1. The macro pore volume and the average pore diameter were evaluated by a mercury intrusion method, and the results are shown in Table 2. The binderless shaped product exhibited an average crush strength of 0.6 kgf as measured on particles having a particle diameter of 1.4 to 1.7 mm.

Comparative Example 3

The adsorption performances of a binderless CaA zeolite having a $SiO_2/Al_2O_3$ molar ratio of 2.0 (available from Tosoh Corporation), which has heretofore widely been used for the purification of a hydrogen-based gas mixture, were evaluated. The results are shown in Table 1. X-ray diffraction of this binderless CaA zeolite revealed that it was a zeolite A, and diffraction attributed to impurities was not observed.

TABLE 1

| Example No. | Cation exchange ratio % | Adsorption capacity for impurities (Nml/g) | | | | | |
|---|---|---|---|---|---|---|---|
| | | CO | | $N_2$ | | $CH_4$ | |
| | | Pressure (atm) 1 | Pressure (atm) 1–0.1 | Pressure (atm) 1 | Pressure (atm) 1–0.1 | Pressure (atm) 1 | Pressure (atm) 1–0.1 |
| Ex. 1 | Li 98.3 | 63.6 | 33.4 | 30.3 | 25.3 | 32.8 | 27.9 |
| Ex. 2 | Li 95.3 | 58.0 | 31.6 | 27.2 | 22.8 | 30.0 | 25.6 |
| Ex. 3 | Li 86.0 | 46.8 | 28.7 | 20.0 | 17.1 | 23.4 | 20.3 |
| Ex. 4 | Ca 94.4 | 46.0 | 19.7 | 26.8 | 20.0 | 29.2 | 20.7 |
| Co. Ex. 1 | Li 97.9 | 57.2 | 29.5 | 26.7 | 22.1 | 29.0 | 24.8 |
| Co. Ex. 2 | Li 97.5 | 56.3 | 29.3 | 26.9 | 22.2 | 29.0 | 24.4 |
| Co. Ex. 3 | Ca 95 | 34.1 | 23.5 | 14.2 | 12.0 | 19.6 | 16.8 |

TABLE 2

| Example No. | Macro pore volume (ml/g) | Average pore diameter ($\mu$m) |
|---|---|---|
| Ex. 1 | 0.27 | 0.47 |
| Co. Ex. 1 | 0.18 | 0.30 |

As seen from Tables 1 and 2, when carbon monoxide, nitrogen and methane are removed for the purification of a hydrogen-based gas mixture by using the above-mentioned high-purity low-silica type X zeolite-containing shaped product according to the method of the present invention, a high adsorption capacity is manifested for these impurities. Therefore, the impurities can be removed with a high efficiency, and hydrogen having a high purity can be obtained with a minimized energy consumption by a small-size adsorption apparatus.

What is claimed is:

1. A method for purifying a hydrogen-based gas mixture comprising the step of contacting said hydrogen-based gas mixture with a zeolite adsorbent; said zeolite adsorbent being a shaped product which is comprised of at least 95%, as determined on the basis of the moisture equilibrium adsorption value, of a low-silica type X zeolite having a $SiO_2/Al_2O_3$ molar ratio in the range of 1.9 to 2.1, and has an average crush strength of at least 1.0 kgf as measured on particles of said shaped product having a particle diameter in the range of 1.4 to 1.7 mm prepared for crush strength measurement.

2. The method according to claim 1, wherein said shaped product of said low-silica type X zeolite contains at least one kind of cation selected from the group consisting of lithium, sodium, potassium, magnesium, calcium and zinc.

3. The method according to claim 1, wherein said shaped product of said low-silica type X zeolite has been ion-exchanged with a lithium ion at an ion exchange ratio of at least 90%.

4. The method according to claim 1, wherein said shaped product of said low-silica type X zeolite has been ion-exchanged with a lithium ion at an ion exchange ratio of at least 95%.

5. The method according to claim 1, wherein said shaped product of said low-silica type X zeolite has been ion-exchanged with a calcium ion at an ion exchange ratio of at least 50%.

6. The method according to claim 1, wherein said shaped product of said low-silica type X zeolite has been ion-exchanged with a calcium ion at an ion exchange ratio of at least 80%.

7. The method according to claim 1, wherein said shaped product of said low-silica type X zeolite has been ion-exchanged with a calcium ion at an ion exchange ratio of at least 90%.

8. The method according to claim 1, wherein said shaped product is comprised of at least 98% by weight, as determined on the basis of the moisture equilibrium adsorption value, of said low-silica type X zeolite.

9. The method according to claim 1, wherein said shaped product is substantially free from a binder.

10. The method according to claim 1, wherein said shaped product of said low-silica type X zeolite has a macro pore volume of at least 0.25 ml/g and an average pore diameter of at least 0.35 μm.

11. The method according to claim 1, wherein said shaped product of said low-silica type X zeolite is a particle having an average particle diameter in the range of 0.5 to 3 mm.

12. The method according to claim 1, wherein said shaped product of said low-silica type X zeolite is a particle having an average particle diameter in the range of 0.5 to 2 mm.

13. The method according to claim 1, wherein said hydrogen-based gas mixture comprises, in addition to hydrogen, at least one gas selected from the group consisting of carbon dioxide, carbon monoxide, nitrogen, water vapor and hydrocarbons.

14. The method according to claim 1, wherein said hydrogen-based gas mixture comprises, in addition to hydrogen, at least one gas selected from the group consisting of carbon monoxide, nitrogen and methane.

15. The method according to claim 1, wherein said gas mixture is contacted with the zeolite adsorbent by at least one method selected from a pressure swing adsorption method and a temperature swing adsorption method.

16. The method according to claim 15, wherein said hydrogen-based gas mixture is contacted with said zeolite adsorbent at an adsorption pressure of 3 to 30 atm.

17. The method according to claim 1, wherein the shaped product has been prepared by a process comprising:

shaping a mixture comprising a low-silica type X zeolite having a $SiO_2/Al_2O_3$ molar ratio in the range of 1.9 to 2.1 and a kaolin clay having a $SiO_2/Al_2O_3$ molar ratio in the range of 1.9 to 2.1, calcining the thus-shaped product, and then contacting the calcined shaped product with a caustic solution capable of dissolving silicon from said calcined shaped product in an amount larger than that of aluminum dissolved from said calcined shaped product whereby the kaolin clay contained in said calcined shaped product is converted to said low-silica type X zeolite.

18. The method according to claim 17, wherein said calcined shaped product is kept in contact with a caustic solution of at least 6 moles per liter, for at least 10 hours.

19. The method according to claim 17, wherein said calcined shaped product is kept in contact with a caustic solution of at least 8 moles per liter, for at least 5 hours.

20. The method according to claim 17, wherein said caustic solution contains an aluminum ingredient previously incorporated therein.

21. The method according to claim 1, wherein said shaped product consists essentially of said low-silica type X zeolite.

22. A method for purifying a hydrogen-based gas mixture comprising the step of contacting said hydrogen-based gas mixture with a zeolite adsorbent; said zeolite adsorbent being a shaped product comprised of at least 95%, as determined on the basis of the moisture equilibrium adsorption value, of a low-silica type X zeolite having a $SiO_2/Al_2O_3$ molar ratio in the range of 1.9 to 2.1, said shaped product having an average crush strength of at least 1.0 kgf as measured on particles of the shaped product having a particle diameter in the range of 1.4 to 1.7 mm prepared for crush strength measurement; said shaped product of the low-silica type X zeolite having been ion-exchanged with a lithium ion at an ion exchange ratio of at least 90%.

23. The method according to claim 22, wherein said shaped product consists essentially of said low-silica type X zeolite.

24. The method according to claim 22, wherein said shaped product is substantially free of binder.

* * * * *